(12) United States Patent
Rippel et al.

(10) Patent No.: US 10,406,885 B2
(45) Date of Patent: Sep. 10, 2019

(54) HVAC UNIT INCLUDING BLOWERS FOR DIRECTING AIRFLOW THROUGH THE HVAC UNIT

(71) Applicant: DENSO International America, Inc., Southfield, MI (US)

(72) Inventors: Christian Rippel, Troy, MI (US); Mark Rothenberg, Farmington Hills, MI (US); Jason Wagnitz, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/499,421

(22) Filed: Apr. 27, 2017

(65) Prior Publication Data
US 2018/0312028 A1 Nov. 1, 2018

(51) Int. Cl.
| | | |
|---|---|---|
| *B60H 1/00* | (2006.01) | |
| *B60H 1/32* | (2006.01) | |
| *B60H 1/12* | (2006.01) | |
| *F25D 21/06* | (2006.01) | |

(52) U.S. Cl.
CPC ..... *B60H 1/00021* (2013.01); *B60H 1/00464* (2013.01); *B60H 1/323* (2013.01); *B60H 1/00564* (2013.01); *B60H 1/12* (2013.01); *B60H 2001/00099* (2013.01)

(58) Field of Classification Search
CPC .. B60H 1/00021; B60H 1/12; B60H 1/00564; B60H 1/00457; B60H 1/00467; B60H 1/00057; B60H 1/00821; B60H 1/00864
USPC ............................................ 165/204; 62/276
See application file for complete search history.

(56) References Cited

U.S. PATENT DOCUMENTS

2002/0053601 A1* 5/2002 Kamiya ............. B60H 1/00792
236/49.3
2008/0223548 A1* 9/2008 Treu .................... B60H 1/00457
165/61

FOREIGN PATENT DOCUMENTS

| DE | 102010060468 A1 * | 5/2012 | ........ B60H 1/00064 |
| JP | 60226315 A * | 11/1985 | ........... B60H 1/0005 |
| JP | 11348533 A * | 12/1999 | |
| JP | 2002067668 A * | 3/2002 | ........ B60H 1/00778 |
| JP | 2006137303 A * | 6/2006 | |

OTHER PUBLICATIONS

Translation of JP 60226315 A entitled Translation—JP 60226315 A.*
Translation of JP 11348533 A entitled Translation—JP 11348533 A.*
Translation of JP 2002067668 A entitled Translation—JP 2002067668 A.*
Translation of JP 2006137303 A entitled Translation—JP 2006137303 A.*
Translation of DE 102010060468 A1 entitled Translation—DE 102010060468 A1.*

* cited by examiner

*Primary Examiner* — Paul Alvare
(74) *Attorney, Agent, or Firm* — Harness, Dickey & Pierce, P.L.C.

(57) ABSTRACT

A heating, ventilation, and air conditioning (HVAC) unit including an air inlet, a plurality of air outlets, a heater, and a plurality of blowers. The plurality of blowers are downstream of the heater with respect to a direction of airflow through the HVAC unit from the air inlet to the plurality of air outlets. The plurality of blowers are configured to control air distribution through the plurality of air outlets.

14 Claims, 3 Drawing Sheets

HVAC UNIT INCLUDING BLOWERS FOR DIRECTING AIRFLOW THROUGH THE HVAC UNIT

FIELD

The present disclosure relates to a heating, ventilation, and air conditioning system (HVAC) unit.

BACKGROUND

This section provides background information related to the present disclosure, which is not necessarily prior art.

Heating, ventilation, and air conditioning (HVAC) units are widely used with HVAC systems to condition the air of a particular environment, such as a vehicle passenger cabin. While current HVAC units are suitable for their intended use, they are subject to improvement. For example, current HVAC units include numerous doors to create a desired airflow and air mix that is required for different HVAC modes. Such doors require an increasingly complex combination of linkages and servo motors to be controlled, and take up valuable space. The present teachings include improved HVAC units that provide numerous advantages over current HVAC units, as explained herein and as one skilled in the art will appreciate.

SUMMARY

This section provides a general summary of the disclosure, and is not a comprehensive disclosure of its full scope or all of its features.

The present teachings include a heating, ventilation, and air conditioning (HVAC) unit. The HVAC unit includes an air inlet, a plurality of air outlets, a heater, and a plurality of blowers. The plurality of blowers are downstream of the heater with respect to a direction of airflow through the HVAC unit from the air inlet to the plurality of air outlets. The plurality of blowers are configured to control air distribution through the plurality of air outlets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
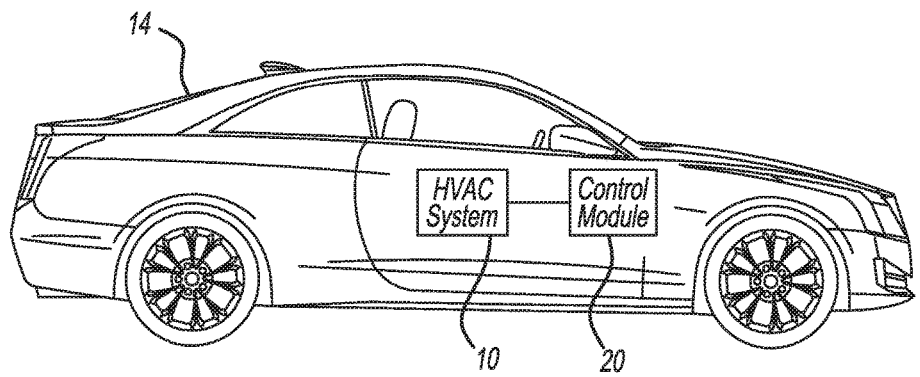
FIG. 1 illustrates an exemplary vehicle including an HVAC system having an HVAC unit in accordance with the present teachings.

FIG. 1 illustrates a heating, ventilation, and air conditioning (HVAC) system 10, including an HVAC unit 12 (FIG. 2) in accordance with the present teachings. FIG. 1 illustrates the HVAC system 10 installed in an exemplary vehicle 14. The vehicle 14 can be any suitable vehicle, such as any suitable passenger vehicle as illustrated, as well as any suitable mass transit vehicle, recreational vehicle, military vehicle, construction vehicle, aircraft, watercraft, etc. The HVAC system 10 including the HVAC unit 12 can also be included with any non-vehicular application, such as any suitable building HVAC system.

The HVAC system 10 and the HVAC unit 12 thereof is controlled by any suitable control module 20. In this application, including the definitions below, the term "control module" may be replaced with "control circuit." "Control module" may refer to, be part of, or include processor hardware (shared, dedicated, or group) that executes code and memory hardware (shared, dedicated, or group) that stores code executed by the processor hardware. The code is configured to provide the features of the control module 20 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 2:
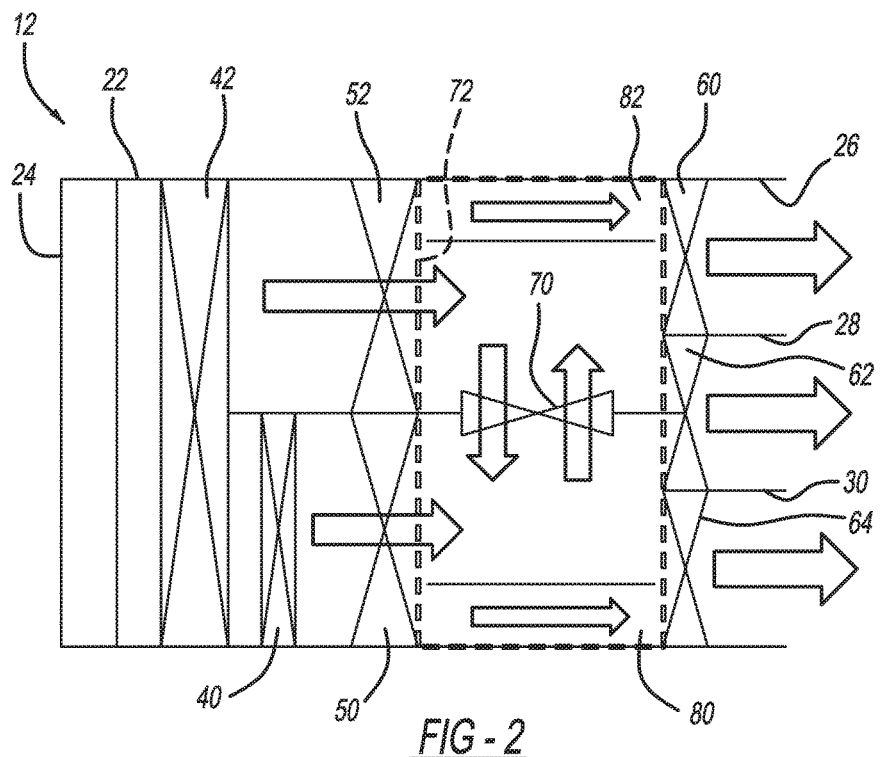
FIG. 2 illustrates an HVAC unit in accordance with the present teachings.

As illustrated in FIG. 2, the HVAC unit 12 includes a case 22 with an air inlet 24. Air is directed into the case 22 through the air inlet 24 in any suitable manner. The case 22 includes a plurality of air outlets such as, for example, a face outlet 26, a foot outlet 28, and a defrost outlet 30. The case 22 can include more outlets than illustrated, as well as fewer outlets. For example, the defrost outlet 30 is optional and need not be included in all applications. Additional possible outlets include, but are not limited to, a rear passenger compartment outlet configured to direct air from the case 22 to a rear of the vehicle 14, or any other suitable vehicle. The face outlet 26 is configured to direct air from the case 22 to vents arranged to direct airflow to faces of occupants of the vehicle 14. The foot outlet 28 is configured to direct airflow through vents arranged to direct airflow to the feet of occupants of the vehicle 14. The defrost outlet 30 is configured to direct airflow through defrost vents, typically arranged at a windshield and/or windows of the vehicle 14 in order to defrost the windshield/windows.

The HVAC unit 12 further includes a heater 40 and an evaporator 42. The heater 40 can be any suitable heater, such as a heater core, configured to heat airflow passing across the heater 40. The evaporator 42 can be any suitable device configured to absorb heat from airflow in order to cool airflow passing across the evaporator 42. Associated with the heater 40 is a heater blower 50. The heater blower 50 is arranged and configured to generate airflow across the heater 40. Associated with the evaporator 42 is an evaporator blower 52, which is configured to generate airflow across the evaporator 42. Both the heater blower 50 and the evaporator blower 52 are controlled by the control module 20. The control module 20 is configured to control activation, speed, and direction of both the heater blower 50 and the evaporator blower 52, as explained further herein. The heater blower 50 and the evaporator blower 52 can be any suitable blowers suitable for generating airflow, and can be reversible.

The HVAC unit 12 further includes a plurality of blowers associated with each one of the outlets 26, 28, and 30. Specifically, a face outlet blower 60 is at the face outlet 26. A foot outlet blower 62 is at the foot outlet 28. A defrost outlet blower 64 is at the defrost outlet 30. The control module 20 is configured to control activation, speed, and direction of each one of the face outlet blower 60, the foot outlet blower 62, and the defrost outlet blower 64 in order to selectively control airflow through each one of the outlets 26, 28, and 30, as explained further herein. The blowers 60, 62, and 64 can be any suitable blowers suitable for generating airflow, and can be reversible.

Figure 3:
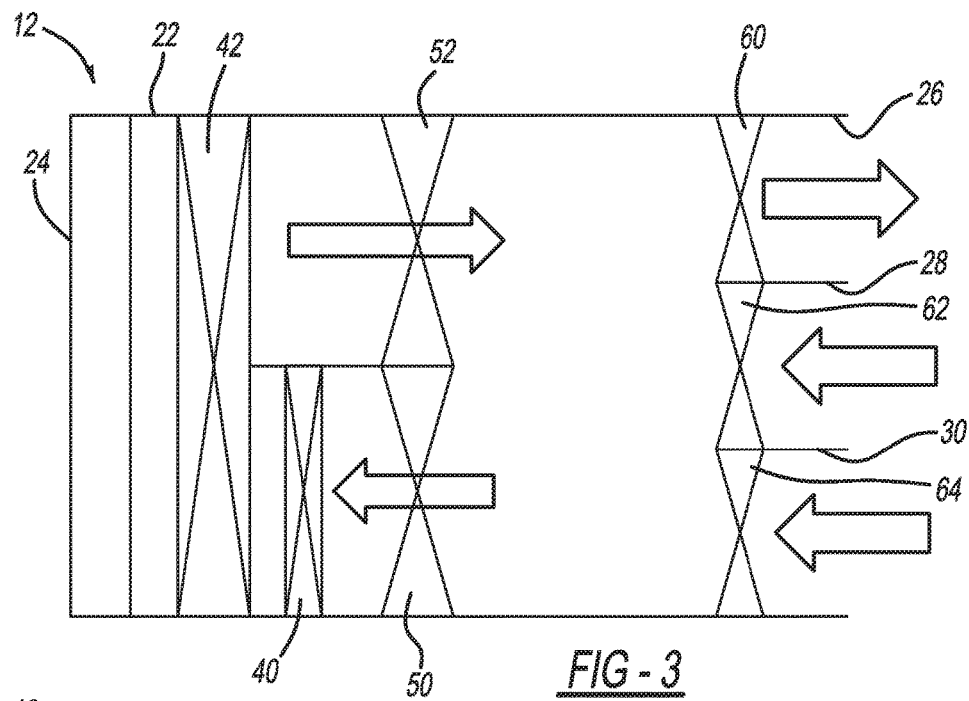
FIG. 3 illustrates the HVAC unit according to the present teachings in a maximum cold mode.
Figure 6:
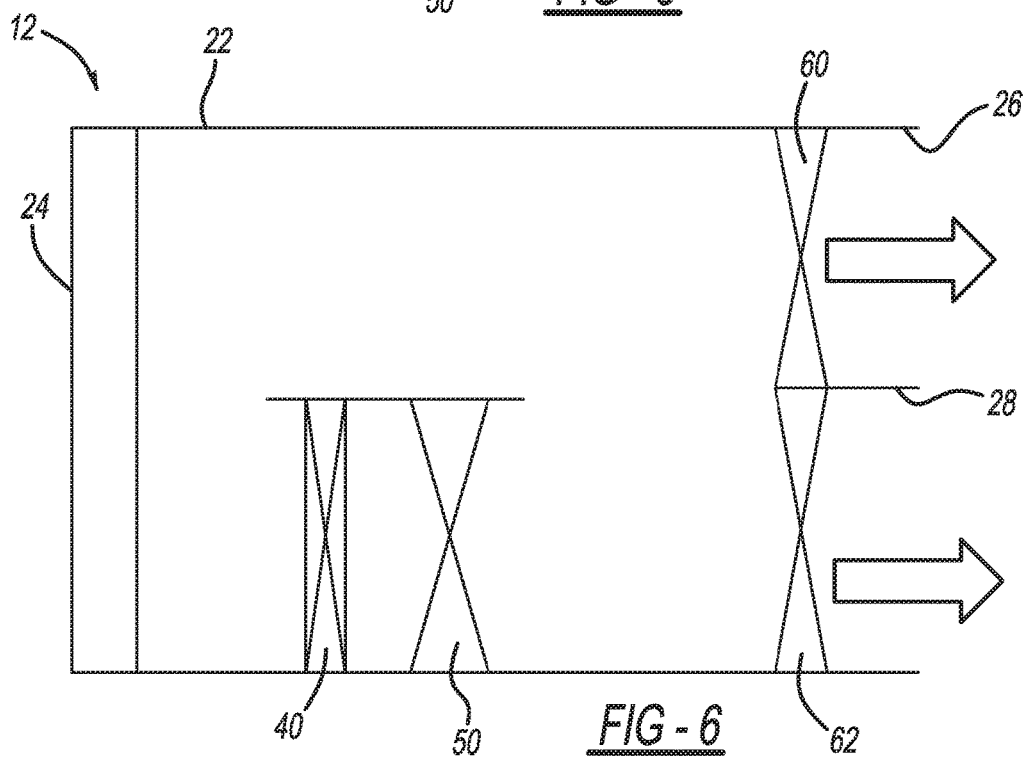
FIG. 6 illustrates an HVAC unit according to the present teachings configured as a heater only unit.

The HVAC unit 12 further includes an air mix blower 70 arranged in an air mix chamber 72. The air mix chamber 72 is arranged downstream of both the heater 40 and the evaporator 42 with respect to the direction of airflow flowing through the case 22 from the air inlet 24 to the outlets 26, 28, and 30. Thus in the air mix chamber 72, airflow from both the heater 40 and the evaporator 42 can be mixed by the air mix blower 70. The air mix blower 70 can be any suitable blower suitable for mixing airflow in the air mix chamber 72. The air mix blower 70 can provide any suitable air mix ratio. The air mix blower 70 is optional, and need not be included in applications that do not use air mixing, such as illustrated in FIGS. 3 and 6 and as described herein.

The HVAC unit 12 can further include a dedicated warm air pathway 80. The dedicated warm air pathway 80 is configured to direct airflow from the heater core 40 to defrost outlet 30. The dedicated warm air pathway 80 is positioned such that airflow passing therethrough bypasses the air mix chamber 72. The HVAC unit 12 can also include a dedicated cool air pathway 82. The dedicated cool air pathway 82 is configured to direct airflow from the evaporator 42 to the face outlet 26. The dedicated cool air pathway 82 is positioned such that airflow passing through the dedicated cool air pathway 82 bypasses the air mix chamber 72. The dedicated warm air pathway 80 and the dedicated cool air pathway 82 are optional and need not be included in all applications. For example, the applications of FIGS. 3, 4, and 6 need not include the dedicated warm and cool air pathways 80 and 82.

The control module 20 is configured to control the HVAC system 10 and the HVAC unit 12 to operate in a variety of different HVAC modes. For example, FIG. 3 illustrates the HVAC unit 12 in a maximum cold face mode. In the maximum cold face mode, the heater 40 is not activated and the air mix blower 70 is not used, and thus not illustrated for clarity. In the max cold face mode of FIG. 3 the evaporator 42 is activated. The evaporator blower 52 is operated by the control module 20 to draw airflow through the evaporator 42 in order to cool the airflow. The cooled airflow is directed towards the face outlet 26. The control module 20 operates the face outlet blower 60 in a forward direction in order to draw the cooled airflow out of the case 22 through the face outlet 26. From the face outlet 26 the cooled airflow is directed to the faces of occupants of the vehicle 14 in order to cool the occupants. The control module 20 operates the foot outlet blower 62, the defrost outlet blower 64, and the heater blower 50 in reverse relative to airflow flowing through the case 22 from the air inlet 24 to the outlet 26. Operating the blowers 62, 64, and 50 in reverse advantageously creates a zero pressure condition, which effectively closes the foot outlet 28 and the defrost outlet 30, and blocks any potential reverse airflow through the heater 40.

Figure 4:
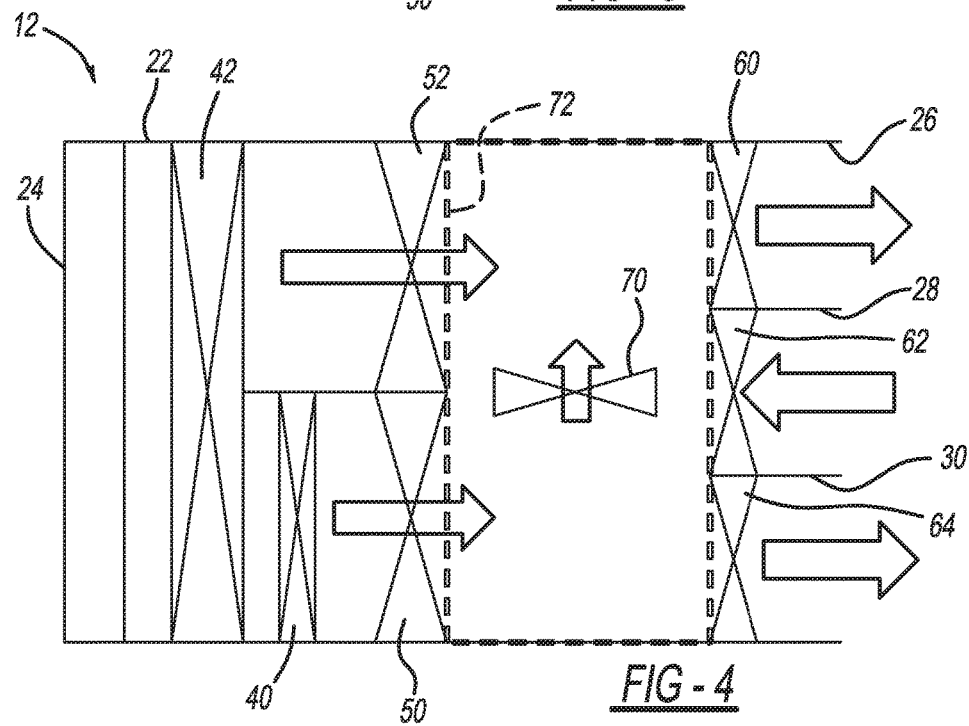
FIG. 4 illustrates the HVAC unit according to the present teachings in a high-level mode with air mixing by an air mix fan.

With reference to FIG. 4, the control module 20 is configured to operate the HVAC unit 12 in a high-level and air mix mode. In the high-level and air mix mode, the heater blower 50, the evaporator blower 52, the face outlet blower 60, and the defrost outlet blower 64 are all operated in a forward direction, so as to draw airflow in a direction from the air inlet 24 towards the outlets 26, 28, and 30. Both the heater 40 and the evaporator 42 are activated. Thus the heater blower 50 draws heated airflow into the air mix chamber 72, and the evaporator blower 52 draws cooled airflow into the air mix chamber 72. The air mix blower 70 is activated in order to mix the heated and cooled airflow. Specifically, the air mix blower 70 is configured to move heated airflow to the cooled airflow in order to mix with the cooled airflow.

The air mix blower 70 can be operated at a low speed to control a face/foot temperature split, such as to provide a 10° F. difference between airflow exiting the face outlet 26 as compared to airflow exiting the defrost outlet 30. For example, the heater 40 can be configured to heat airflow to 80° F., and the evaporator 42 can be configured to cool airflow to 34° F. Because the air mix blower 70 draws some of the heated airflow into contact with the cooled airflow, the result is that airflow exiting the case 22 through the defrost outlet 30 is about 60° F., and airflow exiting through the face outlet 26 is about 50° F. The control module 20 operates the foot outlet blower 62 in reverse, to effectively close the foot outlet 28. The foot outlet blower 62 creates a zero pressure condition to close the foot outlet 28.

Figure 5:
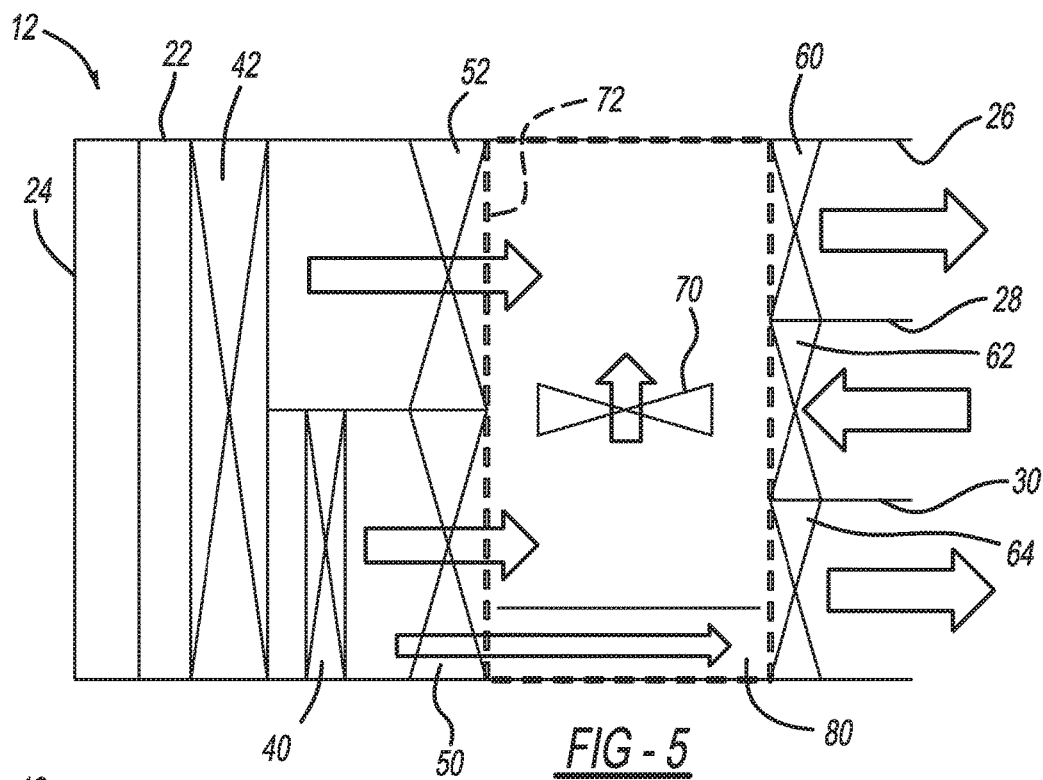
FIG. 5 illustrates the HVAC unit according to the present teachings in a high-level mode with air flowing through a dedicated hot air bypass.

With reference to FIG. 5, the control module 20 is further configured to operate the HVAC unit 12 in a high-level mode with a dedicated hot air bypass provided by the dedicated warm air pathway 80. In the high-level mode with dedicated hot air bypass of FIG. 5, the control module 20 operates the blowers 50, 52, 60, 62, and 64 in the same manner as in the high-level and air mix mode of FIG. 4. The difference is that in the high-level and air mix mode of FIG. 4 the dedicated warm air pathway 80 is not included, while the pathway 80 is included in FIG. 5. The dedicated warm air pathway 80 is optional and may not be included in all applications of the HVAC unit 12. The dedicated cool air pathway 82 is also optional and not illustrated in FIG. 5.

Including the dedicated warm air pathway 80 advantageously provides for a direct pathway of heated air from the heater 40 to the defrost outlet 30. Airflow through the pathway 80 bypasses the air mix chamber 72 and does not mix with cooled airflow. Thus including the dedicated warm air pathway 80 results in warmer air exiting through the defrost outlet 30. For example, when the heater 40 is configured to heat airflow to 80° F., and the evaporator 42 is configured to cool airflow to 34° F., as with the example explained above in conjunction with the description of the high-level and air mix mode of FIG. 4, airflow exiting the defrost outlet 30 will be at about 75° F. and airflow exiting the face outlet 26 will be about 45° F. when the dedicated warm air pathway 80 is included. Thus in this example the dedicated warm air pathway 80 adds about 5° F. to the airflow exiting the defrost outlet 30 (and subtracts about 5° F. from airflow exiting the case 22 through the face outlet 26).

With reference to FIG. 6, the HVAC unit 12 can be provided as a heater only system. In the heater only system of FIG. 6, the evaporator 42, the evaporator blower 52, the defrost outlet 30, the defrost outlet blower 64, and the air mix blower 70 are optional, and not illustrated in FIG. 6 for clarity. The control module 20 operates each of the heater blower 50, the face outlet blower 60, and the foot outlet blower 62 in forward directions so as to draw airflow entering the air inlet 24 through the activated heater 40, and out of the case 22 through both the face outlet 26 and the foot outlet 28. Although the evaporator 42, the evaporator blower 52, the defrost outlet 30, and the defrost outlet blower 64 are not illustrated in FIG. 6, the HVAC unit 12 can still provide a heater only mode even if these features are included. For example, the heater only mode can be provided by deactivating the evaporator 42 and the evaporator blower 52. The defrost outlet blower 64 can be operated in reverse to create a zero pressure condition and effectively close the defrost outlet blower 64.

The present teachings thus advantageously provide for an HVAC unit 12 without airflow doors and the complex mechanical linkages associated therewith. The conventional doors and linkages are replaced with the blowers 50, 52, 60, 62, and 64, which advantageously take up less space than mechanical doors and mechanical linkages, as well as reduce the amount of parts included with the HVAC unit 12 and the development time. The HVAC unit 12 according to the present teachings is also easier to adjust for use with various different vehicle platforms.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) unit comprising:
    an air inlet;
    a plurality of air outlets;
    a heater;
    an evaporator;
    an air mix chamber including a heater portion in receipt of warm airflow heated by the heater and an evaporator portion in receipt of cool airflow cooled by the evaporator;
    an air mix blower in the air mix chamber between the heater portion and the evaporator portion, the air mix blower is positioned to generate airflow in a direction perpendicular to the warm airflow and the cool airflow, and configured to mix the warm airflow of the heater portion with the cool airflow of the evaporator portion;
    a plurality of blowers downstream of the heater with respect to a direction of airflow through the HVAC unit from the air inlet to the plurality of air outlets, the plurality of blowers configured to control air distribution through the plurality of air outlets;
a dedicated warm air pathway configured to direct airflow from the heater to a defrost outlet of the plurality of air outlets, the dedicated warm air pathway is positioned such that airflow through the dedicated warm air pathway bypasses the air mix chamber including the air mix blower; and
a dedicated cool air pathway configured to direct airflow from the evaporator to a face outlet of the plurality of air outlets, the dedicated cool air pathway is positioned such that airflow through the dedicated cool air pathway bypasses the air mix chamber including the air mix blower;
wherein the dedicated warm air pathway and the dedicated cool air pathway are on opposite sides of the air mix chamber such that the air mix chamber is between the dedicated warm air pathway and the dedicated cool air pathway.

2. The HVAC unit of claim 1, wherein the plurality of blowers includes a heater blower configured to generate airflow through the heater.

3. The HVAC unit of claim 1, wherein:
the plurality of blowers are arranged downstream of the evaporator; and
an evaporator blower is included with the plurality of blowers, the evaporator blower configured to generate airflow through the evaporator.

4. The HVAC unit of claim 1, wherein:
the plurality of air outlets includes a face outlet and a foot outlet; and
the plurality of blowers includes a face outlet blower at the face outlet and a foot outlet blower at the foot outlet.

5. The HVAC unit of claim 4, wherein:
the plurality of blowers further includes a defrost outlet blower at the defrost outlet.

6. The HVAC unit of claim 1, wherein at least one of the plurality of blowers is configured to operate in reverse to create airflow in a direction opposite to the direction of airflow through the HVAC unit from the air inlet to the plurality of air outlets.

7. The HVAC unit of claim 1, further comprising a control module configured to individually control activation, speed, and direction of each one of the plurality of blowers.

8. A heating, ventilation, and air conditioning (HVAC) unit comprising:
an air inlet;
a plurality of air outlets;
a heater;
an evaporator;
an air mix blower in an air mix chamber arranged to draw airflow heated by the heater and arranged to draw airflow cooled by the evaporator, wherein the air mix blower is further configured to mix the airflow from the heater with the airflow from the evaporator;
a plurality of outlet blowers, one of the plurality of outlet blowers is at each one of the plurality of air outlets to control air distribution through the respective outlet;
a dedicated warm air pathway configured to direct airflow from the heater to a defrost outlet of the plurality of air outlets, the dedicated warm air pathway is positioned such that airflow through the dedicated warm air pathway bypasses the air mix chamber; and
a dedicated cool air pathway configured to direct airflow from the evaporator to a face outlet of the plurality of air outlets, the dedicated cool air pathway is positioned such that airflow through the dedicated cool air pathway bypasses the air mix chamber;
wherein the dedicated warm air pathway and the dedicated cool air pathway are on opposite sides of the air mix chamber such that the air mix chamber is between the dedicated warm air pathway and the dedicated cool air pathway.

9. The HVAC unit of claim 8, further comprising:
a heater blower configured to generate airflow through the heater; and
an evaporator blower configured to generate airflow through the evaporator.

10. The HVAC unit of claim 8, wherein:
the plurality of air outlets includes a foot outlet; and
the plurality of blowers includes a face outlet blower at the face outlet, a foot outlet blower at the foot outlet, and a defrost outlet blower at the defrost outlet.

11. The HVAC unit of claim 8, wherein at least one of the plurality of blowers is configured to operate in reverse to create airflow in a direction opposite to airflow through the HVAC unit from the air inlet to the plurality of air outlets.

12. A heating, ventilation, and air conditioning (HVAC) unit comprising:
an air inlet;
a plurality of air outlets;
a heater and an evaporator between the air inlet and the air outlets;
a heater blower configured to generate airflow through the heater;
an evaporator blower configured to generate airflow through the evaporator;
an air mix chamber between the plurality of outlets and both the heater and the evaporator, the air mix chamber including a heater portion in receipt of heated airflow blown into the air mix chamber and an evaporator portion in receipt of cooled airflow blown into the air mix chamber cooled by the evaporator;
an air mix blower in the air mix chamber between the heater portion and the evaporator portion, the air mix blower is positioned to generate airflow in a direction perpendicular to the warm airflow and the cool airflow, and configured to mix the heated airflow of the heater portion of the air mix chamber with the cooled airflow of the evaporator portion of the air mix chamber;
a plurality of outlet blowers, one of the plurality of outlet blowers is at each one of the plurality of air outlets to control air distribution through the respective air outlet;
a dedicated warm air pathway configured to direct airflow from the heater to a defrost outlet of the plurality of air outlets, the dedicated warm air pathway is positioned such that airflow through the dedicated warm air pathway bypasses the air mix chamber; and
a dedicated cool air pathway configured to direct airflow from the evaporator to a face outlet of the plurality of air outlets, the dedicated cool air pathway is positioned such that airflow through the dedicated cool air pathway bypasses the air mix chamber;
wherein the dedicated warm air pathway and the dedicated cool air pathway are on opposite sides of the air mix chamber such that the air mix chamber is between the dedicated warm air pathway and the dedicated cool air pathway.

13. The HVAC unit of claim 12, wherein:
the plurality of air outlets includes a foot outlet; and
the plurality of outlet blowers includes a face outlet blower at the face outlet, a foot outlet blower at the foot outlet, and a defrost outlet blower at the defrost outlet.

14. The HVAC unit of claim 12, further comprising a control module configured to individually control activation, speed, and direction of each one of the heater blower, the evaporator blower, the air mix blower, and the plurality of outlet blowers.

* * * * *